United States Patent
Drerup et al.

(10) Patent No.: US 10,191,845 B2
(45) Date of Patent: Jan. 29, 2019

(54) PREFETCH PERFORMANCE

(71) Applicant: International Business Machines Corporation, Armonk, NY (US)

(72) Inventors: Bernard C. Drerup, Austin, TX (US); Richard J. Eickemeyer, Rochester, MN (US); Guy L. Guthrie, Austin, TX (US); Mohit Karve, Austin, TX (US); George W. Rohrbaugh, III, Charlotte, VT (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/606,977

(22) Filed: May 26, 2017

(65) Prior Publication Data
US 2018/0341591 A1    Nov. 29, 2018

(51) Int. Cl.
*G06F 12/0862* (2016.01)
*G06F 12/0897* (2016.01)

(52) U.S. Cl.
CPC ...... *G06F 12/0862* (2013.01); *G06F 12/0897* (2013.01); *G06F 2212/1016* (2013.01); *G06F 2212/602* (2013.01); *G06F 2212/6024* (2013.01)

(58) Field of Classification Search
None
See application file for complete search history.

(56) References Cited

U.S. PATENT DOCUMENTS

| | | | |
|---|---|---|---|
| 5,958,040 A | 9/1999 | Jouppi | |
| 7,472,256 B1 | 12/2008 | Nair et al. | |
| 2002/0099926 A1 | 7/2002 | Sinharoy | |
| 2006/0248280 A1 | 11/2006 | Al-Sukni et al. | |
| 2007/0101100 A1 | 5/2007 | Al Sukhni et al. | |
| 2009/0006813 A1 | 1/2009 | Singhal et al. | |
| 2009/0198964 A1 | 8/2009 | Xiao et al. | |

(Continued)

FOREIGN PATENT DOCUMENTS

WO    2008122662 A1    10/2008

OTHER PUBLICATIONS

N. Kirman et al., "Checkpointed Early Load Retirement," Intl. Symp. on High-Performance Computer Architecture (HPCA), San Francisco, CA, Feb. 2005.

(Continued)

*Primary Examiner* — Brian R Peugh
(74) *Attorney, Agent, or Firm* — ZIP Group PLLC (57) ABSTRACT

Techniques are disclosed for identifying data streams in a processor that are likely to and not likely to benefit from data prefetching. A prefetcher receives at least a first request in a plurality of requests to pre-fetch data from a stream in a plurality of streams. The prefetcher assigns a confidence level to the first request based on an amount of confirmations observed in the stream. The request is in a confident state if the confidence level exceeds a specified value. The first request is in a non-confident state if the confidence level does not exceed the specified value. Requests to prefetch data in the plurality of requests that are associated with respective streams with a low prefetch utilization are deprioritized. Doing so allows a memory controller to determine whether to drop the at least the first request based on the confidence level, prefetch utilization, and memory resource utilization.

7 Claims, 6 Drawing Sheets

(56) References Cited

U.S. PATENT DOCUMENTS

| | | | |
|---|---|---|---|
| 2009/0199190 A1* | 8/2009 | Chen | G06F 9/383 |
| | | | 718/102 |
| 2010/0241811 A1 | 9/2010 | Solihin | |
| 2011/0173397 A1* | 7/2011 | Boyle | G06F 12/0862 |
| | | | 711/137 |
| 2013/0124829 A1 | 5/2013 | Chou et al. | |
| 2014/0019721 A1 | 1/2014 | Stavrou et al. | |
| 2014/0108740 A1 | 4/2014 | Rafacz | |
| 2014/0149679 A1 | 5/2014 | Rowlands et al. | |
| 2014/0310479 A1 | 10/2014 | Hooker et al. | |
| 2016/0011996 A1* | 1/2016 | Asaad | G06F 15/76 |
| | | | 710/308 |
| 2017/0147493 A1 | 5/2017 | Eickemeyer et al. | |

OTHER PUBLICATIONS

H. Zhou et al., "Enhancing Memory Level Parallelism via Recovery-Free Value Prediction," ICS '03, Jun. 23-26, 2003, San Francisco, CA.

Y. Chen et al, "Global-Aware and Multi-Order Context-Based Prefetching for High-Performance Processors," The International Journal of High Performance Computing Applications 25(4), 2011, pp. 355-370.

* cited by examiner

PREFETCH PERFORMANCE

BACKGROUND

Embodiments presented herein are related to data prefetching in a processor, and more specifically, to identifying data streams that do and do not benefit from prefetching.

Data prefetching is a technique that allows a processor to reduce stall time on data accesses. Rather than waiting for a cache miss to initiate a memory fetch, a prefetcher in the processor observes, e.g., in a cache memory, data streams referencing patterns and predicts future references based on such patterns. The prefetcher then retrieves the predicted reference data from the cache memory before the processor actually references the data. Doing so allows the processor to reduce memory access latency and thus increase performance of the processor.

Generally, data prefetch techniques establish streams based on predicted patterns. An initial access to an established stream is referred to as an allocation. Further, each subsequent access to that stream (i.e., an actual demand for a given cache line) is referred to as a confirmation. The prefetcher may determine whether to issue a request to prefetch data from a given stream based on the depth of the stream, i.e., an amount of confirmations observed in the stream. Typically, the prefetcher may drop requests if the depth for the stream is low, e.g., the stream has no confirmations. However, one drawback to such an approach is that, occasionally, once the prefetch engine observes at least one confirmation, the prefetcher may determine that the next subsequent accesses to the stream are sequential cache lines and, as a result, blindly issues prefetch requests, even if the accesses do not correspond to sequential cache lines. Consequently, such superfluous prefetches may evict useful cache lines, causing future misses on those cache lines and/or may consume more bandwidth than necessary.

SUMMARY

One embodiment presented herein discloses a method.

Another embodiment presented herein discloses a processor that includes a prefetcher.

Another embodiment presented herein discloses a system. The system includes a memory and a processor. The processor includes a prefetcher that is configured.

DETAILED DESCRIPTION

Embodiments presented herein disclose techniques for improving data prefetch performance in a processor. More specifically, techniques provide a prefetcher in the processor of a computer system that tracks streams of data accesses spread over one or more threads in a processor core. The prefetcher includes a prefetch request queue that tracks an amount of confirmations (i.e., actual demands for cache lines) observed for a given stream. Further, the prefetch request queue maintains an amount of prefetch requests issued to memory for each stream and schedules subsequent requests to be issued.

In one embodiment, the prefetch request queue assigns a confidence level to each request. The confidence level may indicate a degree at which confirmations have been observed in a stream associated with that request. For example, if a relatively high number of confirmations is observed in a particular stream, requests associated with that stream may have a high confidence level. A high confidence level may indicate that the stream depth is relatively large, and thus, the stream may benefit from prefetching data. As another example, if zero to a relative few amount of confirmations are observed in the stream, the requests associated with that stream may have a low confidence level. A low confidence level may indicate that the stream is recently established and may benefit from some prefetching or may indicate that the stream has little to no prefetching benefit (e.g., the stream is associated with a random access pattern workload, or the like).

In one embodiment, a memory controller in the computer system may determine which prefetch requests to issue or drop based on a respective confidence level, prefetch utilization level, and current memory resource utilization. For example, if the memory resource utilization is currently high, the memory controller may determine to drop requests having a lower confidence level. The memory controller may adjust confidence level thresholds and prefetch utilization threshold based on the current memory resource utilization, such that the memory controller further drops lower confidence level requests as the memory resource utilization increases and/or drops prefetch requests when prefetching is not being utilized.

Further, the prefetcher includes a phase prediction component that maintains a phase counter for each thread executing in the processor. Each phase counter tracks the number of prefetch requests in a confident state (i.e., confidence levels exceeding a specified phase count threshold) and the number of prefetch requests in a non-confident state (i.e., confidence levels that do not exceed the specified phase count threshold). For example, the prefetcher may increment the thread-specific phase counter for each prefetch request in a confident state and decrement for each prefetch request in a non-confident state.

Further, the prefetcher includes a prefetch utilization component that maintains a prefetch utilization counter for each thread executing in the processor. Each prefetch utilization counter tracks the number of prefetched lines utilized. For example, the prefetcher may decrement the thread-specific prefetch utilization counter for each prefetch request received and increment for each utilization of a prefetch cache line. Each prefetch utilization component may compare the number of utilized prefetched cache lines by its associated thread against one or more of the following: a number of prefetched cache lines requested by its associated core, a number of prefetched cache lines to-be sent, a number of perfected cache lines actually received.

The prefetcher may determine whether to increase or decrease a rate at which prefetches occur for a given stream based on the thread-specific phase counter, the prefetch utilization counter, as well as the current memory resource utilization. In particular, the prefetcher may determine whether to select an aggressive, a conservative, or an ultra-conservative ramp to apply towards a given stream. For instance, the prefetcher may select an aggressive ramp for streams of a thread where the phase counter exceeds a given phase threshold. That is, a thread having a high phase counter likely has a considerable amount of confirmations observed in the data stream(s) of the thread. Thus, prefetching at an aggressive rate may be beneficial for streams of such threads.

The prefetcher may select a conservative ramp for streams in a thread where the phase counter does not exceed the phase threshold, where the prefetch utilization exceeds a given prefetch utilization threshold, and when the current memory resource utilization is high. That is, a thread having a low phase counter and high prefetch utilization counter in memory constrained environments likely has fewer confirmations observed in the data stream(s) of the thread. Further, the prefetcher may select an aggressive ramp for such threads if the current memory resource utilization is low. That is, if memory utilization is low, bandwidth may be more efficiently used by advancing more streams through the prefetcher.

The prefetcher may select an ultra-conservative ramp for streams in a thread where the phase counter does not exceed the phase threshold and where the prefetch utilization does not exceed the prefetch utilization threshold. That is, a thread having a low phase counter and low prefetch utilization counter likely has little to no confirmations observed in the data stream(s) of the thread.

Advantageously, techniques presented herein allow a processor to optimize prefetch efficiency relative to current memory resource utilization and constraints. By assigning a confidence level to each prefetch request in a stream based on depth of the stream and by considering a rate of prefetch utilization, the prefetcher prioritizes streams that are likely to benefit from prefetching and streams where prefetching does not result in much performance benefit. Accordingly, the prefetcher may adaptively adjust rates at which prefetching for a given stream occurs. In addition, the memory controller can determine, based on confidence level, prefetch utilization, and memory utilization, prefetch requests to drop to conserve memory usage bandwidth.

Figure 1:
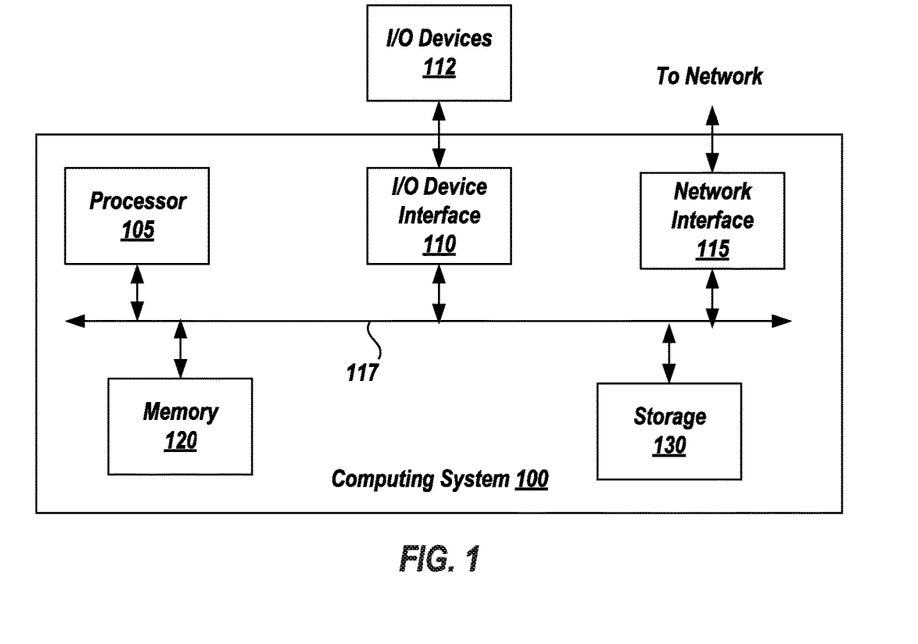
FIG. 1 illustrates an example computing system configured with a processor that identifies data streams that do and do not benefit from prefetching based on stream depth, prefetch utilization, and memory bandwidth constraints, according to one or more embodiments.

FIG. 1 illustrates an example computing system 100 configured with a processor that identifies data streams that benefit from prefetching based on stream depth and memory bandwidth constraints, according to one embodiment. As shown, the computing system 100 further includes, without limitation, a network interface 115, a memory 120, and a storage 130, each connected to a bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, etc. Of course, the computing system 100 will include a variety of additional hardware components.

The processor 105 retrieves and executes programming instructions stored in the memory 120 as well as stores and retrieves application data residing in the storage 130. The bus 117 is used to transmit programming instructions and application data between the processor 105, I/O device interface 110, network interface 115, memory 120, and storage 130. The memory 120 is generally included to be representative of a random access memory. The memory 120 stores program instructions and operand data used by the processor 105. The storage 130 may be a combination of fixed and/or removable storage devices, such as fixed disc drives, removable memory cards, or optical storage, network attached storage (NAS), or a storage-area network (SAN).

Figure 2:
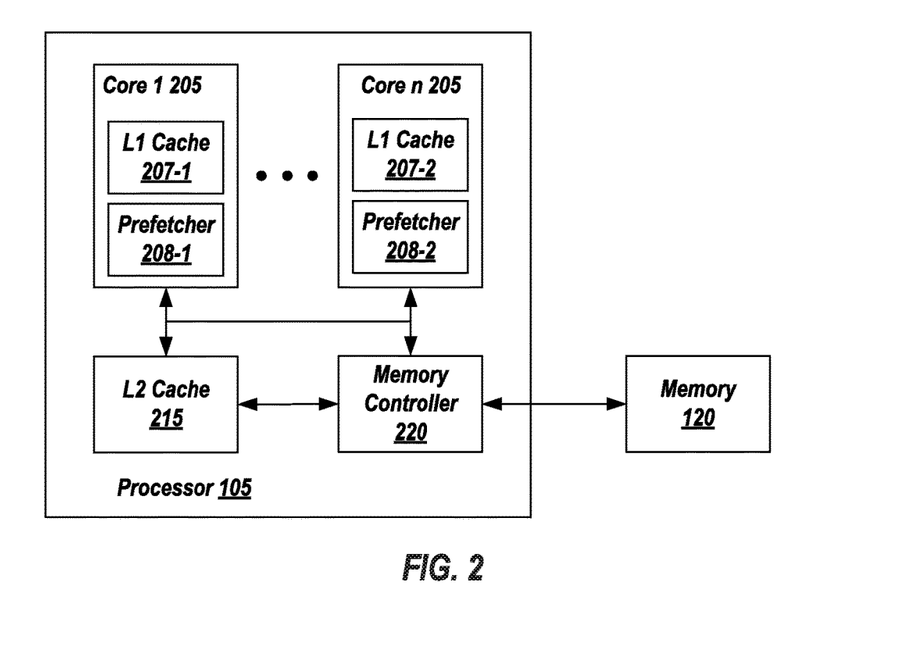
FIG. 2 further illustrates the processor described relative to FIG. 1, according to one or more embodiments.

FIG. 2 further illustrates the processor 105 configured to identify data streams that are likely and unlikely to benefit from prefetching based on stream depth, prefetching utilization, and memory resource utilization, according to one embodiment. As shown, the processor 105 includes one or more cores, from core 1 205 to core n 205, a Level 2 (L2) cache 215, and a memory controller 220. Of course, the processor 105 may include a variety of additional components.

As shown, the cores 205 each include a Level 1 (L1) cache 207, and a prefetcher 208. For example, core 1 205 includes a L1 cache 207-1 and a prefetcher 208-1 and core n 205 includes a L1 cache 207-n and a prefetcher 208-n. Hereinafter a generic reference to either prefetcher 208-1 or prefetcher 208-n may be referred to as prefetcher 208 and a generic reference to either L1 cache 207-1 or L1 cache 207-n may be referred to as L1 cache 207.

The prefetcher 208 identifies and prefetches access patterns of the memory 120. Further, the prefetcher 208 manages a cache structure for prefetch streams, e.g., on the L1 cache 207. Further still, the prefetcher 208 predicts which of the streams will be required by the processor 105.

The L1 caches 207 and L2 cache 215 may include separate instruction and data caches implemented using high speed memory devices. The caches 207 and 215 may temporarily store values that might be repeatedly accessed by the processor 105 to more quickly process data, e.g., by avoiding loading values directly from the memory 120. Additional cache levels (e.g., a Level 3 (L3) cache) may be provided. Each cache level from highest (L1) to lowest (L3) may successively store more information, but at a longer access penalty. Further, each cache includes a number of memory blocks that individually store various instructions and data values. A cache line, or a memory block in the cache, can include a variety of fields, such as an address field and a value field.

The prefetcher 208 prefetches data from established streams. To do so, the prefetcher 208 may include logic that detects monotonically increasing or decreasing sequences of demand accesses to cache lines having a common address spacing. Once established, an initial access to the stream is referred to as an allocation. Further, each subsequent access to that stream (i.e., an actual demand for a given cache line) is referred to as a confirmation. A depth associated with a stream is based on the amount of confirmations observed in the stream.

As further described below, the prefetcher 208 may assign a confidence level to each prefetch request for a given stream. The confidence level may be based on a depth of a stream associated with a request, as the stream depth indicates how many sequential demand load instances are observed in the stream. The prefetcher 208 may assign a low confidence level to a request associated with a stream having a relatively low amount of confirmations. The confidence level may be higher with the greater amount of confirmations observed in the stream. A high confidence level indicates that issuing the particular prefetch request is likely to be required by the processor 105.

In one embodiment, the memory controller 220 is configured to receive prefetch requests from prefetcher 208. The memory controller 220 may determine, based on confidence levels, prefetch utilization, and memory utilization whether to drop requests or honor prefetch requests. For example, in the event that memory bandwidth is constrained, the memory controller 220 may drop certain prefetch requests. And the more constrained the memory bandwidth becomes, the memory controller 220 may decide to only honor prefetch requests of the highest confidence level. In one embodiment, the memory controller 220 may evaluate a memory utilization threshold profile to determine which level requests to drop based on current memory utilization. The memory utilization threshold profile may be based on memory utilization over an amount of past cycles. For instance, if memory resource utilization was relatively low during the past amount of cycles, the memory controller 220 may honor lower confidence level prefetch requests. In practice, a memory utilization threshold profile based on utilization during the past 1,000 cycles has been shown to be effective.

Further, the prefetcher 208 may maintain a phase counter for each thread executing in the processor 105. The phase counter tracks requests in a confident state (i.e., having a confidence level that exceeds a given phase threshold) and those in a non-confident state. For example, the phase counter may increment each time the prefetcher 208 observes a request in a confident state and decrement each time the prefetcher 208 observes a request in a non-confident state. As further described below, the prefetcher 208 may predict well-performing streams based on the phase counter. Doing so allows the prefetcher 208 to determine which streams to aggressively ramp based on the prediction.

Further, the prefetcher 208 may maintain a prefetch utilization counter for each thread executing in the processor 105. The prefetch utilization counter tracks the number of used prefetched cache lines. For example, the prefetch utilization counter may be incremented when a prefetched cache line is used and decremented when a prefetched cache line is requested. As further described below, the prefetcher 208 may predict under-performing streams based on the prefetch utilization counter. Doing so allows the prefetcher 208 to determine which streams to ultra-conservatively ramp based on the prediction.

Figure 3:
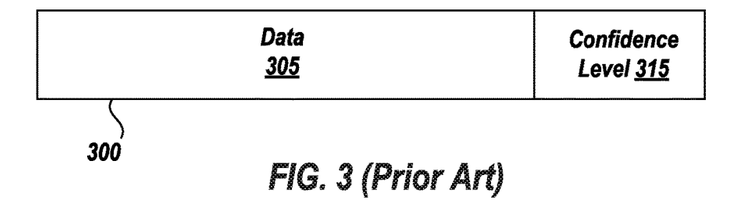
FIG. 3 illustrates an exemplary prefetch request that includes a field specifying a confidence level associated with the request, according to one or more embodiments.

FIG. 3 illustrates an example prefetch request 300 that includes a field specifying a confidence level associated with the request, according to one embodiment. As shown, the prefetch request 300 includes request data 305 and a confidence level 315. The request data 305 may specify information associated with the request, such as a data address, thread identifier, stream identifier, and a prefetch source.

As stated, the prefetcher 208 may add a confidence level to each request 300 based on a depth (i.e., a number of confirmation accesses) of a stream. In one embodiment, the confidence level 315 is a 2-bit field representing levels 0-3, where confidence level 0 represents the lowest confidence level and where confidence level 3 represents the highest confidence level.

Each level may be associated with a specified amount of confirmations. For instance, prefetch requests of confidence level 0 may be associated with streams that have zero to one confirmations. In such a case, the stream may only have an allocation access and one confirmation (i.e., the stream depth is low). Prefetch requests of confidence level 1 may include up to four confirmations, and prefetch requests of confidence level 2 may include up to eight confirmations. Prefetch requests of confidence level 3 may have greater than eight confirmations. Such confidence level 3 requests may be indicative of sections in code that may benefit from aggressive prefetching. Various components of the prefetcher 208 may evaluate stream performance based on confidence levels of the requests and act in response to such an evaluation, e.g., prioritizing certain streams over others. Likewise, the memory controller 220 may determine which requests to prioritize based on current memory resource utilization.

Figure 4:
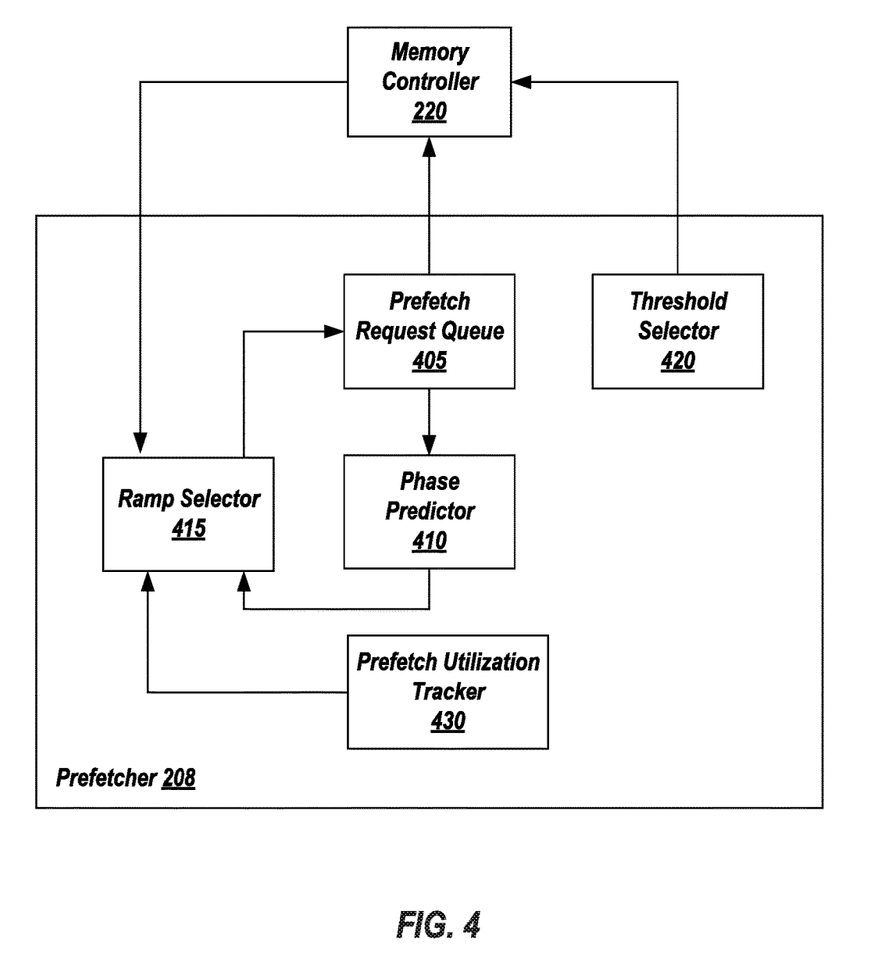
FIG. 4 illustrates an exemplary prefetcher, according to one or more embodiments.

FIG. 4 illustrates an exemplary prefetcher 208, according to one embodiment. As shown, the prefetcher 208 further includes a prefetch request queue 405, a phase predictor 410, a ramp selector 415, a threshold selector 420, and a prefetch utilization tracker 430.

In one embodiment, the prefetch request queue 405 is a tracking mechanism that tracks n streams of data accesses over m threads in a core 205. The prefetch request queue 405 maintains an amount of confirmations (i.e., actual demands for prefetched lines) observed in each of the streams. Further, the prefetch request queue 405 tracks an amount of prefetch requests issued for each stream and schedules a next appropriate prefetch request to be sent to the memory 120.

Further still, the prefetch request queue 405 may evaluate a stream depth associated with each outgoing request. Doing so allows the prefetch request queue 405 to add a confidence score to each outgoing request. The prefetch request queue 405 may then send each request to the memory controller 220. Based on an amount of requests that are already in a memory access queue, the confidence level of an incoming request, and prefetch utilization, the memory controller 220 may decide whether to drop or honor the request. In addition, the threshold selector 420 may send a threshold memory utilization profile to the memory controller 220 that is based on historical memory resource utilization (e.g., from the past x cycles). For instance, the memory utilization threshold profile may indicate that over the last 1,000 cycles, memory resource utilization was relatively low. In such a case, the memory controller 220 may decide to honor prefetch requests at a lower memory utilization threshold (e.g., given that current memory resource utilization is also relatively low).

The prefetch request queue 405 may also send confidence information to the phase predictor 410. The phase predictor 410 maintains thread-specific phase counters 412 (not shown in FIG. 4) that track confidence levels of requests for streams observed in each thread. For instance, the phase predictor 410 may increment the thread-specific counter for each confident state request (i.e., requests having a confidence level that exceeds a specified threshold) and decrement the counter for each non-confident state request that the prefetcher 208 sends out. A relatively high phase count can indicate that the thread is in a section of code that can benefit from prefetching.

The prefetch utilization tracker 430 maintains thread-specific prefetch utilization counters 432 (not shown in FIG. 4) that track the number of used prefetched cache lines used. For example, the prefetch utilization tracker 430 may increment the prefetch utilization counter 432 when a prefetched cache line is used and may decrement the prefetch utilization counter 432 when a prefetched cache line is requested. As further described below, the prefetcher 208 may predict under-performing streams based on the prefetch utilization counter 432. A relatively high prefetch count can indicate that the thread is in a section of code where accesses to the memory 120 are moderately random and thus unlikely to benefit from aggressive prefetching. A relatively low prefetch count can indicate that the thread is in a section of code where accesses to the memory 120 are mostly random and thus unlikely to benefit from even judicious prefetching.

The phase predictor 410 may forward phase counter 412 information and the prefetch utilization tracker 435 may forward prefetch utilization counter information to the ramp selector 415. The ramp selector 415 may determine, based on the phase counter 412, the prefetch utilization counter, and current memory resource utilization (retrieved from the memory controller 220), whether to increase or decrease a rate at which prefetches occur at a given stream. For example, the ramp selector 415 may select an aggressive ramp for streams of a thread where the phase counter 412 exceeds a given phase threshold. That is, a thread associated with a high phase counter 412, likely has a considerable amount of confirmations observed in the data stream(s) of the thread. Thus, prefetching at an aggressive rate may be beneficial for streams of such threads, due to the likelihood that the associated thread is in a section of code where memory access is sequential.

The ramp selector 415 may select a conservative ramp for streams in a thread where the phase counter 412 does not exceed the phase threshold, where the prefetch utilization exceeds a given prefetch utilization threshold, and when the current memory resource utilization is high. That is, a thread associated with a low phase counter 412 and high prefetch utilization counter 432, in memory constrained environments, likely has fewer confirmations observed in the data stream(s) of the thread. Doing so allows the processor 105 to conserve memory bandwidth when such memory resources are constrained. Further, the prefetcher may select an aggressive ramp for these types of threads if the current memory resource utilization is low. That is, if memory utilization is low, bandwidth may be more efficiently used by advancing more streams through the prefetcher.

The ramp selector 415 may select an ultra-conservative ramp for streams in a thread where the phase counter 412 does not exceed the phase threshold and where the prefetch utilization does not exceed the prefetch utilization threshold. That is, a thread associated with a low phase counter 412 and low prefetch utilization counter 432, likely has little to no confirmations observed in the data stream(s) of the thread.

Figure 5A:
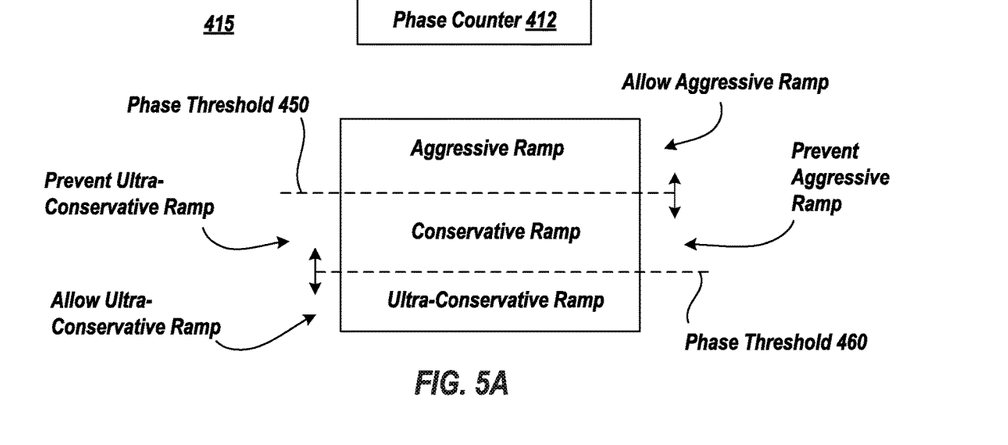
FIG. 5A illustrates an exemplary scheme to determine phase or confidence level, according to one or more embodiments.

FIG. 5A illustrates an exemplary scheme for ramp selector 415 to select a particular ramp for a stream based upon the phase counter 412, based upon an aggressive phase threshold 450, and based upon an ultra-conservative phase threshold 460. The aggressive phase threshold 450 is a predetermined phase counter 412 value that establishes a minimum phase for the aggressive ramp to be selected for the stream. If the phase counter 412 is above the aggressive phase threshold 450, the ramp selector 415 is allowed to select the aggressive ramp for the stream. For example, a stream with many confirmations and corresponding high confidence level may have a phase counter 412 above the aggressive phase threshold 450 and the aggressive ramp may resultantly be selected.

If the phase counter 412 is below the aggressive phase threshold 450, the ramp selector 415 is prevented from selecting the aggressive ramp for the stream but for when memory 120 utilization is low. For example, a stream with few confirmations and corresponding low confidence level may have a phase counter 412 below the aggressive phase threshold 450 and the aggressive ramp may resultantly be disallowed. However, in certain embodiments, when memory 120 utilization is low, the aggressive ramp may be selected for the stream with few confirmations and corresponding low confidence level.

The ultra-conservative phase threshold 460 is a predetermined phase counter 412 value that establishes a maximum phase for the ultra-conservative ramp to be selected for the stream. If the phase counter 412 is below the ultra-conservative phase threshold 460, the ramp selector 415 is allowed to select the ultra-conservative ramp for the stream. For example, a stream with very few confirmations and corresponding low confidence level may have a phase counter 412 below the ultra-conservative phase threshold 460 and the ultra-conservative ramp may resultantly be selected. If the phase counter 412 is above the ultra-conservative phase threshold 460, the ramp selector 415 is prevented from selecting the ultra-conservative ramp for the stream.

Figure 5B:
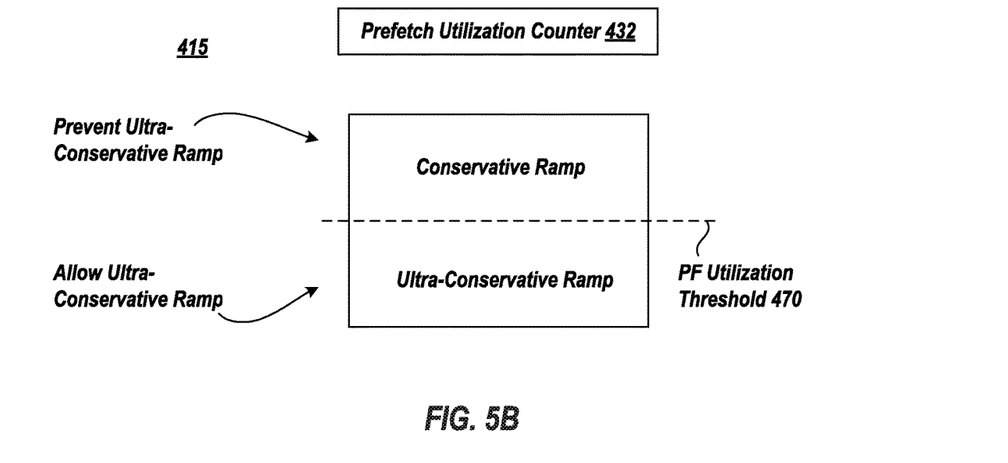
FIG. 5B illustrates an exemplary scheme to determine prefetch utilization, according to one or more embodiments.

FIG. 5B illustrates an exemplary scheme for ramp selector 415 to select a particular ramp for a stream based upon the prefetch utilization counter 432 and based upon a prefetch utilization threshold 470. If the prefetch utilization counter 432 is below the prefetch utilization threshold 470, the ramp selector 415 is allowed to select the ultra-conservative ramp for the stream. If the prefetch utilization counter 432 is above the prefetch utilization threshold 470, the ramp selector 415 is prevented from selecting the ultra-conservative ramp for the stream.

In an embodiment, the prefetch utilization counter 432 may track a ratio that indicates the number of used prefetched cache lines in a stream against one or more of the following (1) the total number of cache lines in the stream that are to be prefetched by prefetcher 208, (2) the number of requested cache lines that need to be fetched from memory 120, and/or (3) the number of cache lines actually received by memory 120. For example, the prefetcher 208 receives or generates a request or function to prefetch one hundred cache lines within a particular data stream. Of these one hundred cache lines, seventy of the cache lines hit (i.e. are already located within a cache of processor 105 (e.g., a last level cache, etc.)) and the remaining thirty of the cache lines are not located within the caches of processor 105. Therefore, prefetcher 208 may request thirty of the cache lines from memory 120. However, memory 120 declines twenty of the thirty requested cache lines and returns only ten of the thirty requested cache lines. Therefore, in the present example, the value of (1) is one hundred, the value of (2) is thirty, and the value of (3) is ten.

The terms, "used prefetched cache line," "cache line is utilized," or the like is defined to mean either (a) that a requested cache line by prefetcher 208 hit within a cache (e.g. last level cache, etc.) of processor 105, (b) a requested cache line by prefetcher 208 hit against an outstanding prefetch miss (i.e. the requested cache line is not yet in the processor 105 cache but is in route thereto), or (c) a confirm would have been seen against a stream where a prefetch is not allowed if prefetching would have been allowed to occur. As such, in embodiments, each instance (a), (b), or (c) occur, the prefetch utilization counter 432 may be incremented.

Generally, a ramp specifies a quantity of prefetch request(s) by prefetcher 208 for data within a given stream until steady state is reached. When the stream is initially accessed, the stream is referred to as an allocate. Further, each subsequent access to that stream (i.e., an actual demand for a given cache line) is a confirmation. The prefetcher 208 may determine whether to issue a request to prefetch data from the given stream based on the ramp selected for that stream. The prefetcher may drop requests if the number of allowed requests as specified by the selected ram has already been issued.

The aggressive ramp specifies that one or more prefetch request for data from the stream is allowed per the allocation of the stream and per each subsequent confirm of the stream, until steady state is reached. For example, at a particular instance, a stream has been allocated and has nine subsequent confirms. The aggressive ramp may indicate that five prefetch requests are allowed per allocate and per each confirm. Therefore, at this instance, for this given stream and for such specification of the aggressive ramp, the prefetcher 208 is allowed fifty prefetch requests for data within the stream (i.e., five prefetch requests per allocate and five prefetch requests per each confirm). At a subsequent instance, another confirm has been established and, as a result, the prefetcher 208 is allowed an additional five prefetch requests for data from the stream.

The conservative ramp specifies that only one prefetch request for data from a stream is allowed per the allocation and only one prefetch request for data from the stream per the next "n" number of confirms and is followed by the aggressive ramp until steady state is reached. For example, a stream has been allocated and has four subsequent confirms prior to steady state. The conservative ramp may indicate that one prefetch request is allowed per allocate and per each next two confirms. Subsequent to the two confirms, the aggressive ramp allows for five prefetch request for each next confirm. In other words, thirteen prefetch requests are allowed based upon one request per allocate and per each of the next two confirms and based upon five requests per each of the next two confirms. Therefore, for this given stream and for such specification of the conservative ramp, the prefetcher 208 is allowed to prefetch thirteen requests for data within the stream.

The ultra-conservative ramp specifies that no prefetch requests for data from a stream are allowed per the allocation and "m" number of confirms and is followed by the conservative ramp and is subsequently followed by the aggressive ramp, until steady state is reached. For example, a stream has been allocated and has five subsequent confirms prior to reaching steady state. The ultra-conservative ramp may indicate that no prefetch requests are allowed per allocate and per next two confirms. In other words, the ultra-conservative ramp may indicate that a prefetch request is not allowed for the first three accesses of the stream. The conservative ramp may indicate that one prefetch request is allowed per each next two confirms and the aggressive ramp allows for five prefetch requests per each next confirm. In other words, seven prefetch requests are allowed based upon no allowed requests per allocate and per next two confirms, based upon one allowed request per each of the next two confirms, and based upon five allowed requests per the last confirm.

Figure 6:
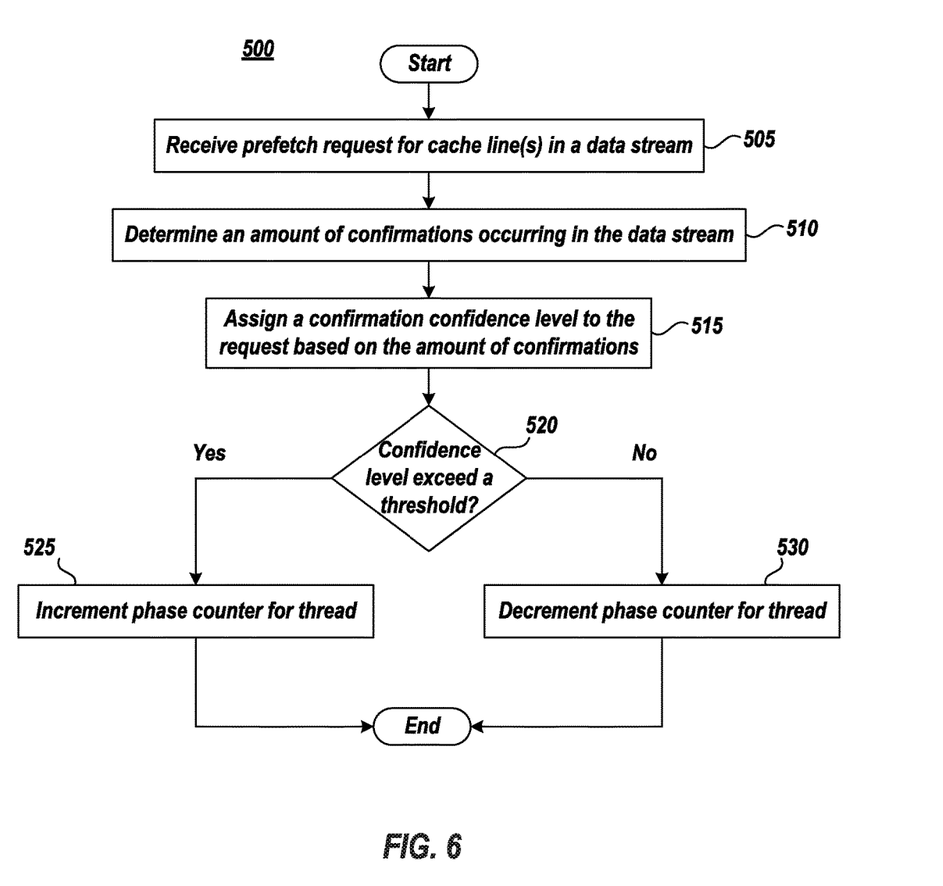
FIG. 6 illustrates a method for adjusting a phase or a confidence level count, according to one or more embodiments.

FIG. 6 illustrates a method 500 for determining a confidence level of a prefetch request, according to one or more embodiments. As shown, the method 500 begins at step 505, where the prefetch request queue 405 receives or generates a prefetch request or prefetch function for a cache line in a data stream. At step 510, the prefetch request queue 405 determines an amount of data stream confirmations. At step 515, the prefetch request queue 405 assigns a confidence level to the request based on the number of confirmations. The prefetch request queue 405 may determine whether the confidence level exceeds a predetermined confidence level threshold (at step 520). If the confidence level of the request exceeds a specified confidence level threshold, then the request has a high confident level. In contrast, if the confidence level of the request does not exceed the confidence level threshold, the request has a low confidence level.

If the confidence level exceeds the confidence level threshold, then the request is in a confident state. In such a case, at step 525, the phase predictor 410 increments a thread-specific phase counter 412 associated with that thread. However, if the confidence level does not exceed the confidence level threshold, then at step 530, the phase predictor 410 decrements the phase counter 412. As stated, the phase counter 412 may indicate whether streams in a given thread can benefit from prefetching (e.g., because the thread may be executing a code region that requires sequential memory accesses). Further, based on the confidence levels of a given stream, the memory controller 220 may determine which prefetch requests to drop, based on current memory constraints.

Figure 7A:
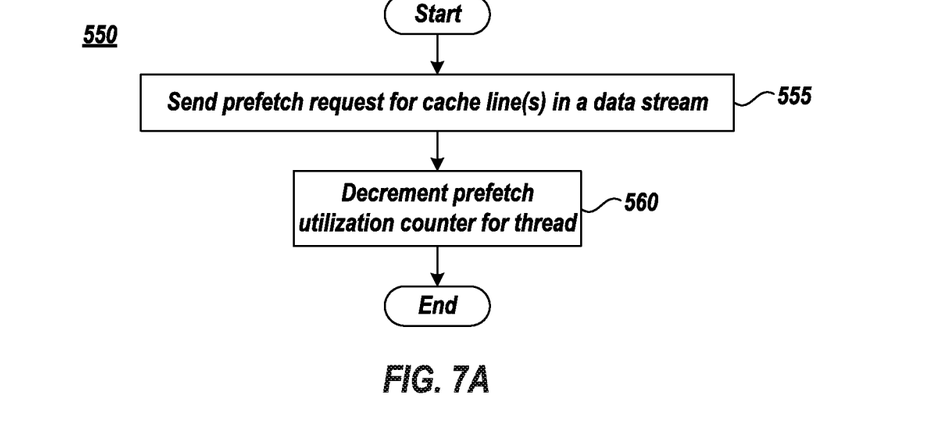
FIG. 7A and FIG. 7B illustrate methods for adjusting a prefetch utilization count, according to one or more embodiments.

FIG. 7A illustrates a method 500 for adjusting a prefetch utilization count, according to one or more embodiments. As shown, the method 550 begins at step 555, where the prefetch request queue 405 sends or generates a prefetch request or prefetch function for a cache line in a data stream. At step 560, thread-specific prefetch utilization counter 432 is decremented.

Figure 7B:
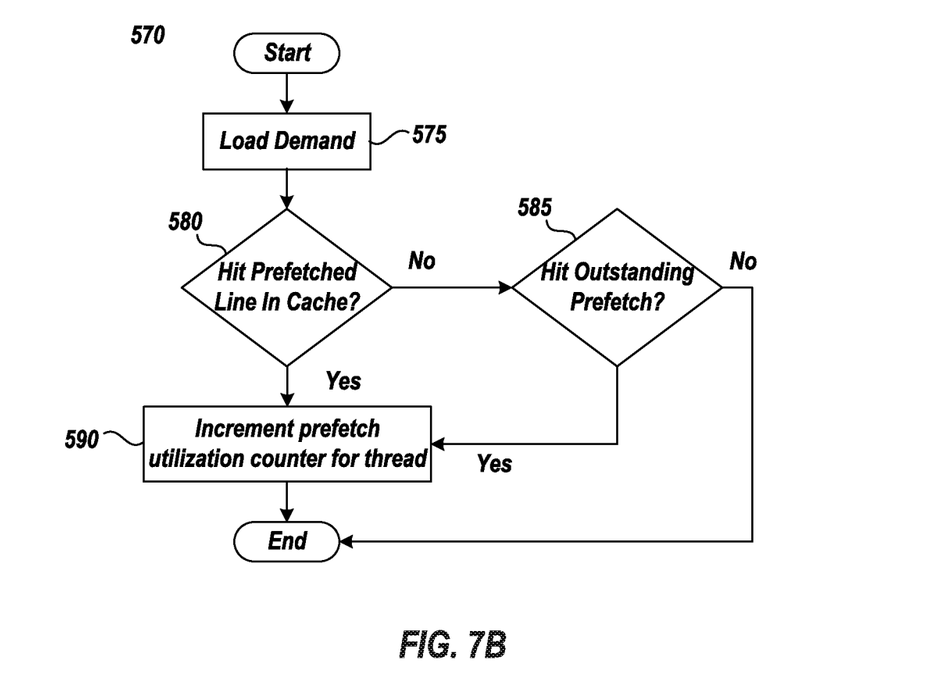

FIG. 7B illustrates a method 70 for adjusting a prefetch utilization count, according to one or more embodiments. As shown method 570 begins at step 575, where the core 205 sends a load demand. For example, core 205 requests a particular data. At step 580, it is determined whether a prefetched cache line is hit, or in other words, whether the request may be satisfied by prefetched data within a cache associated with core 205. If it is determined that the request may be satisfied by prefetched data within the associated cache, the core consumes or utilizes that prefetched cache line, and the prefetch utilization counter 320 is incremented (block 590).

If it is determined that the request cannot be satisfied by prefetched data within the associated cache, at step 585, it is determined whether an outstanding to-be prefetched cache line is hit, or in other words, whether the request may be satisfied by to-be prefetched data (e.g., the requested cache line is inbound, there is an outstanding prefetch request for the requested line, or the like). If it is determined that the request may be satisfied by to-be prefetched data, the prefetch utilization counter 430 is incremented (block 590). If it is determined that the request cannot be satisfied by to-be prefetched data, method 570 ends.

In certain embodiments, method 570 may also include a step of determining whether a confirm would have been seen against a stream where a prefetch is not allowed if prefetching would have been allowed to occur and incrementing the associated prefetch utilization counter 430.

In embodiments, the incrementing and decrementing of the prefetch utilization counters 320 occurs at different instances and are triggered by different, generally unrelated events. The prefetch utilization counters 320 are decremented when a prefetch request is sent. However, subsequently, which may be tens of thousands of cycles from when the prefetched cache line was installed in the cache, the core 205 will consume or utilize the prefetched cache line, where upon which, the prefetch utilization counter associated therewith is incremented.

As indicated above, the terms "used prefetched cache line," "cache line is utilized," or the like is defined to mean either (a) that a requested cache line by prefetcher 208 hit within a cache (e.g. last level cache, etc.) of processor 105. Regarding, this scenario, prefetched data has already been brought into the cache, speculatively (no load seen yet), and such prefetched cache lines are generally marked with a special state, as is known in the art. This state changes upon the utilization of these cache line. Because of the associated state change of the cache line that has been utilized, a defacto protection is established to ensure that the prefetch utilization counters 320 does not count two hits/utilizations against the same cache line.

In embodiments, the prefetch utilization counter 320 may be incremented and decremented by different increments. For example, the prefetch utilization counter 320 may be decremented by a value of one for every prefetch sent, and incremented by a value of (one+X) for every prefetch utilized. This means that if more than 1/X prefetches are utilized, the prefetch utilization counter 320 saturates at the top, whereas if fewer than 1/X prefetches are utilized, the counter saturates at the bottom. For example, if X is five, if one prefetch is used for every six sent, every such prefetch request set has a deficit of one and in a short time the prefetch utilization counter 320 will be at zero. Conversely if one prefetch out of four is used on average, we have a net increase of one, so the prefetch utilization counter 320 will saturate to a maximum. Thus, in embodiments, the particular prefetch utilization threshold 470 value adjusted based upon the value of X of incrementing the prefetch utilization counter 320 upon prefetch utilization.

In an embodiment, the prefetch utilization counter 432 tracks a ratio that indicates the number of used prefetched cache lines in a stream against one or more of the following (1) the total number of cache lines in the stream that are to be prefetched by prefetcher 208, (2) the number of requested cache lines that need to be fetched from memory 120, and/or (3) the number of cache lines actually received by memory 120.

Figure 8:
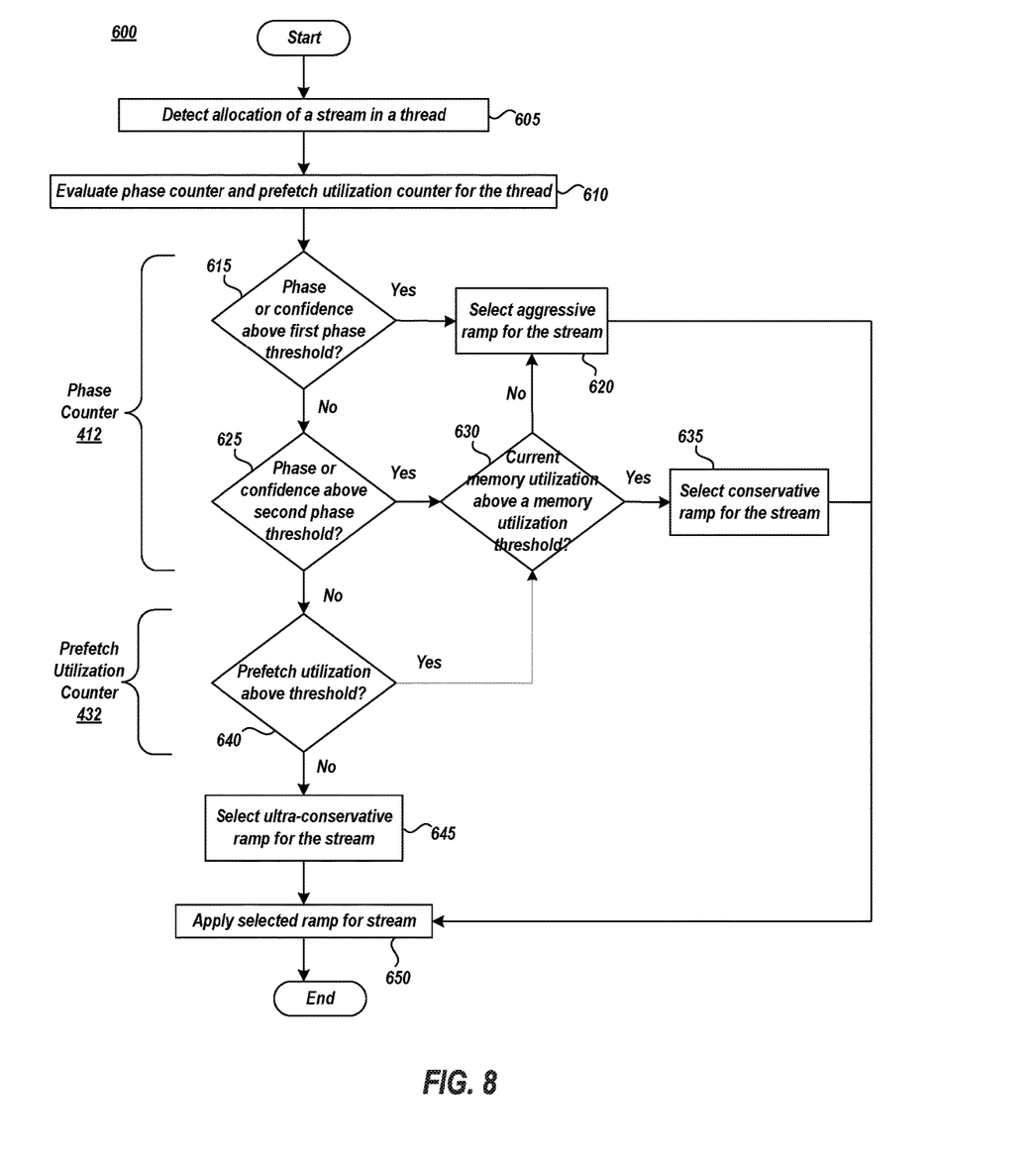
FIG. 8 illustrates a method for ramping performance of a given stream based on confidence level of prefetch requests and based on prefetch utilization each associated with the stream, according to one or more embodiments.

FIG. 8 illustrates a method 600 for ramping performance of a given stream based on confidence states of prefetch requests and upon prefetch utilization each associated with the stream, and upon memory utilization, according to one or more embodiments. As shown, the method 600 begins at step 605, where the prefetcher 208 detects an allocation of a stream in a given thread. The phase predictor 410 may send phase counter 412 information associated with the thread to the ramp selector 415 and the prefetch utilization tracker 430 may send prefetch utilization counter 432 information associated with the thread to the ramp selector 415.

At step 610, the ramp selector 415 evaluates the thread-specific phase counter 412 and also evaluates the thread-specific prefetch utilization counter 432. The ramp selector 415 may also evaluate current memory resource utilization (retrieved from the memory controller 220). At step 615, the ramp selector 415 determines whether the phase counter 412 is above the aggressive phase threshold 450. That is, the ramp selector 415 determines whether the stream is associated with a relatively high amount of confident or non-confident state requests. At step 620, if the phase counter 412 is above the aggressive phase threshold 450, which indicates that the stream is associated with a relatively high amount of confident state prefetch requests, the ramp selector 415 selects the aggressive ramp for the stream.

At step 625, if the phase counter 412 is below the aggressive phase threshold 450, it is determined whether the phase counter 412 is above the ultra-conservative phase threshold 460. That is, the ramp selector 415 determines whether the stream is associated with a relatively high amount of confident or non-confident state requests. If the phase counter 412 is below the ultra-conservative phase threshold 460, the ramp selector 415 is allowed to select the ultra-conservative ramp for the stream at method 600 may continue to step 640. If the phase counter 412 is above the ultra-conservative phase threshold 460, the ramp selector 415 is prevented from selecting the ultra-conservative ramp for the stream and method 600 continues to step 630.

At step 630, the ramp selector 415 evaluates current memory 120 utilization to determine whether the current memory 120 utilization exceeds a memory utilization threshold. That is, the ramp selector 415 evaluates whether the memory 120 is currently busy or constrained. At step 620, if the memory 120 is not currently busy or constrained, the ramp selector 415 selects the aggressive ramp for the stream. Doing so allows the prefetcher 208 to increase efficiency by using memory resources that might otherwise go unused, even if the prefetches are from streams associated with low-phase counter 412.

Otherwise, at step 635, if the current memory 120 utilization exceeds the memory utilization threshold (e.g., memory 120 is busy, constrained, or the like), then the ramp selector 415 selects the conservative ramp for the stream.

At step 640, if the phase counter 412 is below the ultra-conservative phase threshold 460, which indicates that the stream is associated with a relatively low or no amount of confident state prefetch requests, the ramp selector 415 evaluates the thread-specific prefetch utilization counter 432 to determine whether the prefetch utilization counter 432 is above the prefetch utilization threshold 470. That is, the ramp selector 415 determines whether stream is associated with a relatively high amount of utilized or non-utilized prefetched cache lines. At step 645, if the prefetch utilization counter 432 is below the prefetch utilization threshold 470, which indicates that the stream is associated with a relatively low amount of utilized prefetched cache lines, the ramp selector 415 selects the ultra-conservative ramp for the stream.

At step 630, if the prefetch utilization counter 432 is above the prefetch utilization threshold 470, which indicates that the stream is associated with a relatively high amount of utilized prefetched cache lines, method 600 returns to step 630.

At step 650, the prefetch request queue 405 applies the selected ramp for the stream. For example, the prefetch request queue 405 applies the aggressive ramp selected at step 620 to the stream, the conservative ramp selected at step 635 to the stream, or the ultra-conservative ramp selected at step 645 to the stream.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method, comprising:
   receiving at least a first request in a plurality of requests to pre-fetch data from a stream in a plurality of streams;
   assigning a confidence level to the at least the first request based on an amount of confirmations observed in the stream, wherein the at least the first request is in a confident state if the confidence level exceeds a specified phase threshold and wherein the at least the first request is in a non-confident state if the confidence level does not exceed the specified phase threshold;
   prioritizing requests to prefetch data in the plurality of requests having a higher confidence level than the confidence level of the first request to pre-fetch data;
   deprioritizing requests to prefetch data in the plurality of requests that are associated with respective streams with a low prefetch utilization ratio; and
   determining whether to drop the at least the first request based on the confidence level, based upon a prefetch utilization ratio of the stream, and based upon a memory resource utilization threshold.

2. The method of claim 1, further comprising:
   maintaining a phase counter for each stream in the plurality of streams, wherein the phase counter is incremented for each request in the confident state and wherein the counter is decremented for each request in the non-confident state; and
   maintaining a prefetch utilization counter for each stream in the plurality of streams, wherein the prefetch utilization counter is decremented for each request to pre-fetch data from the stream and wherein the prefetch utilization counter is incremented when a cache line in the stream is utilized.

3. The method of claim 2, further comprising:
   determining whether to increase or decrease a rate at which pre-fetches from the stream occur based on the phase counter for the stream, based upon the prefetch utilization counter for the stream, and a current memory resource utilization.

4. The method of claim 3, further comprising:
   upon determining that the current memory resource utilization is below a specified threshold, increasing the rate at which the pre-fetches occur.

5. The method of claim 1, further comprising, prior to determining whether to drop the at least first request:
   selecting the memory resource utilization threshold based on memory resource utilization during a specified amount of past cycles.

6. The method of claim 1, further comprising:
   upon determining that the confidence level does not exceed the memory resource utilization threshold, dropping the first request.

7. The method of claim 1, further comprising:
   upon determining that the confidence level does not exceed the memory resource utilization threshold and upon determining that the prefetch utilization ratio of the stream does not exceed a prefetch utilization threshold, dropping the first request.

* * * * *